US011906995B2

(12) United States Patent
Mangano et al.

(10) Patent No.: US 11,906,995 B2
(45) Date of Patent: Feb. 20, 2024

(54) POWER SUPPLY CIRCUIT INCLUDING FIRST AND SECOND VOLTAGE REGULATORS, CORRESPONDING DEVICE AND METHOD FOR CONTROLLING ACTUATION OF THE VOLTAGE REGULATORS IN MULTIPLE OPERATION MODES

(71) Applicant: STMicroelectronics S.r.l., Agrate Brianza (IT)

(72) Inventors: Daniele Mangano, San Gregorio di Catania (IT); Francesco Clerici, Aci Castello (IT); Pasquale Butta', Messina (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/836,417

(22) Filed: Jun. 9, 2022

(65) Prior Publication Data

US 2022/0397924 A1 Dec. 15, 2022

(30) Foreign Application Priority Data

Jun. 10, 2021 (IT) ........................ 102021000015176

(51) Int. Cl.
*G05F 1/56* (2006.01)
*G05F 1/46* (2006.01)

(52) U.S. Cl.
CPC .............. *G05F 1/562* (2013.01); *G05F 1/468* (2013.01)

(58) Field of Classification Search
CPC ............. G05F 1/562; G05F 1/468; G05F 5/00
See application file for complete search history.

(56) References Cited

U.S. PATENT DOCUMENTS

| | | | |
|---|---|---|---|
| 8,552,703 | B2 | 10/2013 | Liu et al. |
| 11,029,716 | B1 | 6/2021 | Chan et al. |
| 2007/0216383 | A1 | 9/2007 | Al-Shyoukh et al. |
| 2009/0115379 | A1 | 5/2009 | Al-Shyoukh |

(Continued)

FOREIGN PATENT DOCUMENTS

WO 2018060990 A1 4/2018

OTHER PUBLICATIONS

IT Search Report and Written Opinion for priority application, IT 102021000015176, report dated Feb. 15, 2022, 14 pgs.

*Primary Examiner* — Jue Zhang
*Assistant Examiner* — Lakaisha Jackson
(74) *Attorney, Agent, or Firm* — Crowe & Dunlevy

(57) ABSTRACT

A voltage regulator coupled between a first node and second node includes a first (full-power) regulator circuit and a second (low-power) regulator circuit. In a first mode: the first regulator circuit is activated (with the second regulator circuit inactive) when the voltage at the first node is a battery voltage, and the voltage regulator is kept de-activated when the voltage at the first node is a ground voltage. In a second mode: the first regulator circuitry in is active (with the second regulator circuitry inactive) when the voltage at the first node is a battery voltage, and the voltage regulator is inactive when the voltage at the first node is a ground voltage. In a third mode: the second regulator circuitry is active (with the first regulator circuitry inactive) irrespective of the voltage at the first node being at the battery voltage or the ground voltage.

19 Claims, 4 Drawing Sheets

(56) References Cited

U.S. PATENT DOCUMENTS

| | | | | |
|---|---|---|---|---|
| 2011/0133709 | A1 | 6/2011 | Mengad | |
| 2014/0028278 | A1* | 1/2014 | Pedersen | G06F 1/3296 323/304 |
| 2017/0054356 | A1 | 2/2017 | Wright | |
| 2019/0146530 | A1 | 5/2019 | Kotrc et al. | |
| 2020/0075061 | A1* | 3/2020 | Rowley | G06F 1/3296 |
| 2020/0326739 | A1* | 10/2020 | Zhao | H02M 3/33561 |

* cited by examiner

POWER SUPPLY CIRCUIT INCLUDING FIRST AND SECOND VOLTAGE REGULATORS, CORRESPONDING DEVICE AND METHOD FOR CONTROLLING ACTUATION OF THE VOLTAGE REGULATORS IN MULTIPLE OPERATION MODES

PRIORITY CLAIM

This application claims the priority benefit of Italian Application for Patent No. 102021000015176, filed on Jun. 10, 2021, the content of which is hereby incorporated by reference in its entirety to the maximum extent allowable by law.

TECHNICAL FIELD

The description relates to power supply circuits.

One or more embodiments can be applied to a variety of products such as, for instance, industrial electronics applications, mass-market applications (in an Internet-of-Things or IoT context, for instance), various embedded applications and so on.

BACKGROUND

In operation, voltage regulators such as Low Drop-Out (LDO) regulators configured to support "high-voltage" capability (e.g., at 4.5V) may give rise to a significant junction temperature increase that, in some instances, makes using such a regulator hardly feasible.

It is otherwise noted that, in certain circumstances, such a high-voltage capability of the regulator may not be essential and may thus be superfluous.

Increased flexibility in configuring device supply schemes according to specific application requirements thus represents a desirable feature.

There is accordingly a need in the art for a solution that addresses the issued outlined above.

SUMMARY

One or more embodiments relate to a circuit.

One or more embodiments relate to a corresponding system. A MicroController Unit (MCU) with an associated (external) memory (e.g., a flash memory) may be exemplary of such a device.

One or more embodiments may relate to a corresponding method.

One or more embodiments provide the possibility of selecting whether a voltage regulator (for instance an LDO regulator of the embedded type) is desired to be activated at power-on and become available for being controllably switched off together with associated control circuits in order to save power.

One or more embodiments offer the possibility of selecting a desired supply scheme based on application requirements in terms of, e.g., power consumption, battery supply range and thermal performance with reduced power consumption and semiconductor area cost.

One or more embodiments may provide a flexible supply scheme admitting various operating conditions such as: single supply at 4.5V with an external load (such as an external memory) supplied with a supply voltage in the range 1.8V-3.3V; dual supply at 4.5V/3.6V with the external load supplied with a supply voltage in the range 1.8V-3.6V;

and single supply at 3.6V with an external load supplied with a supply voltage of 2.5V-3.6V.

The quantitative figures given above are purely exemplary and are not limiting of the embodiments.

BRIEF DESCRIPTION OF THE DRAWINGS

One or more embodiments will now be described, by way of example only, with reference to the annexed figures, wherein.

DETAILED DESCRIPTION

Corresponding numerals and symbols in the different figures generally refer to corresponding parts unless otherwise indicated.

The figures are drawn to clearly illustrate the relevant aspects of the embodiments and are not necessarily drawn to scale.

The edges of features drawn in the figures do not necessarily indicate the termination of the extent of the feature.

In the ensuing description, various specific details are illustrated in order to provide an in-depth understanding of various examples of embodiments according to the description. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", or the like, that may be present in various points of the present description do not necessarily refer exactly to one and the same embodiment. Furthermore, particular configurations, structures, or characteristics may be combined in any adequate way in one or more embodiments.

The headings/references used herein are provided merely for convenience and hence do not define the extent of protection or the scope of the embodiments.

For the sake of brevity and simplicity, a same designation (VBAT, VDDIO, and so on, for instance) may be used in the following to designate both a certain circuit node or line and a signal (a voltage signal, for instance) occurring at that node or line.

Figure 1:
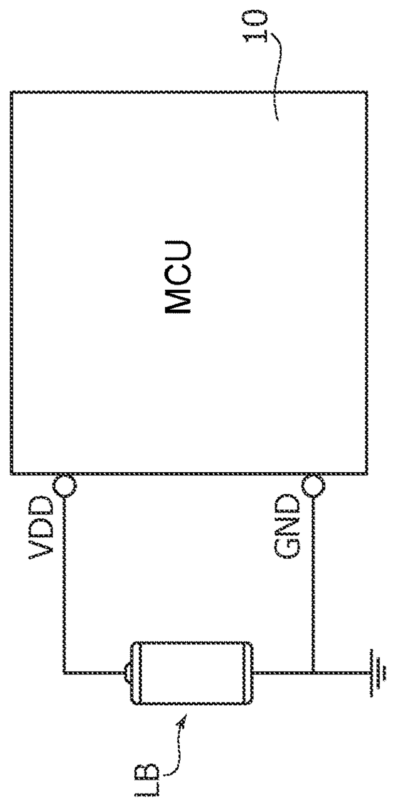
FIG. 1 (Prior Art)
FIG. 1 is a general block diagram of a circuit.

FIG. 1 is a simplified representation of a circuit 10 such as, for instance, a MicroController Unit or MCU supplied via a supply source such as a battery LB, for instance.

A (rechargeable) lithium-ion battery may be exemplary of the battery LB. Those of skill in the art will otherwise appreciate that the embodiments are not limited to the presence of such a battery, which is otherwise a distinct element from the embodiments. For instance, the battery LB may be a battery intended to be coupled to the circuit 10 ("plugged-in") only by an end-user and/or over limited periods of time.

A battery such as LB is representative of supply source configured to apply to the circuit 10 a supply voltage between a "hot" node VDD and ground GND.

As discussed in the foregoing, while batteries such as modern re-chargeable lithium-ion batteries have an operating voltage up to 4.5V and a (slightly) higher charging voltage, most commercial technologies do not include devices able/required to operate above 3.6V.

Reaching higher voltages involves using "high-voltage" circuits that may be fairly complex and increase semiconductor area occupancy, cost, and power consumption.

Figure 2:
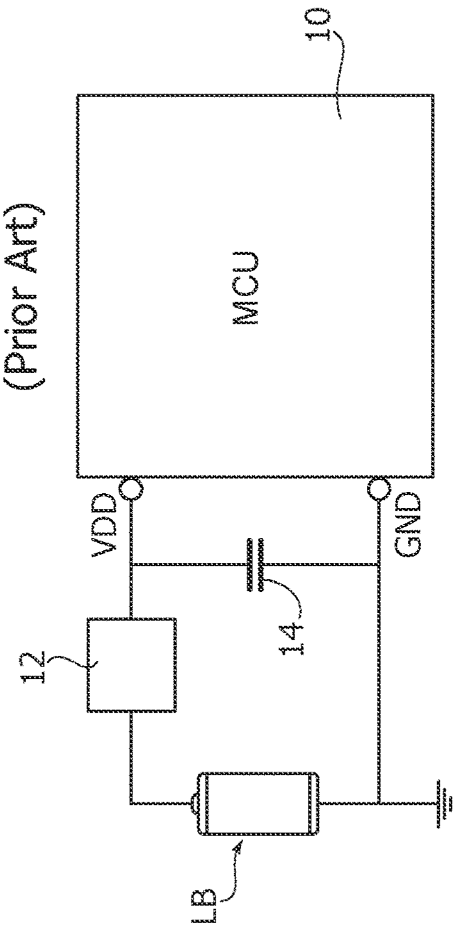
FIG. 2 (Prior Art)
FIGS. 2 and 3 are block diagrams exemplary of conventional arrangements resorted to in connection with a circuit as illustrated in FIG. 1.

FIG. 2 is exemplary of one such conventional approach where an (external) voltage regulator (REG) 12 is provided between the battery LB and the node VDD in the circuit 10, with a coupling capacitor 14 provided between the node VDD and ground GND.

An arrangement as exemplified in FIG. 2 suffers from the presence of extra components, which negatively affect the Bill of Materials (BoM) with increased size, complexity, and cost.

Additional drawbacks involve increased power consumption in the active mode as well as in a low-power (quiescent) mode.

All of the foregoing renders the solution exemplified in FIG. 2 hardly attractive for applications such as Internet of Things (IoT) applications where reduced consumption in a low-power mode is desirable.

Figure 3:
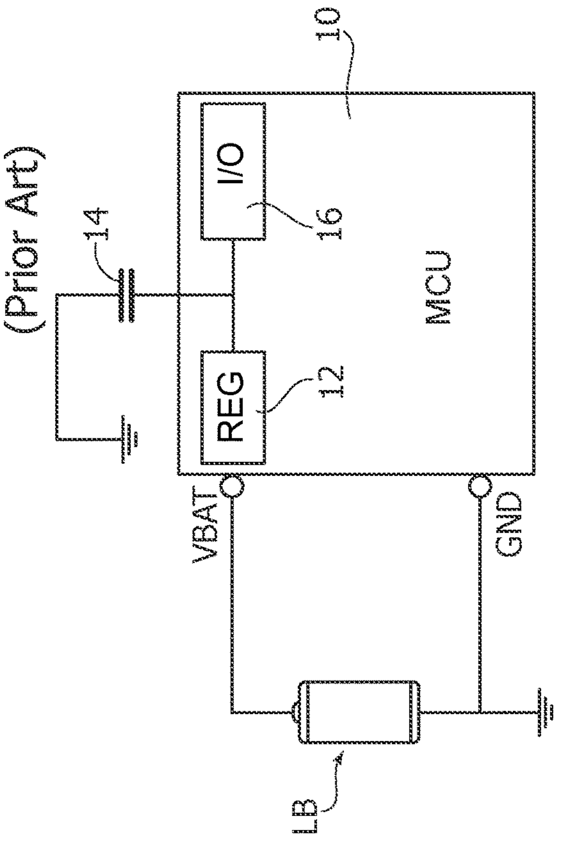
FIG. 3 (Prior Art)

Another conventional approach as exemplified in FIG. 3 is based on System on Chip (SoC) architecture wherein the regulator 12 is "embedded" in the circuit 10 with the provision of input/output (I/O) analog circuitry 16 similarly embedded in the circuit 10. The decoupling capacitor 14 can be arranged between ground GND and a node intermediate the embedded regulator 12 and the circuitry 16.

While providing slightly better performance, an arrangement as exemplified in FIG. 3 essentially suffers from the same drawbacks discussed in connection with FIG. 2.

One or more embodiments described in the following address the drawbacks outlined above as discussed in relation with FIG. 2 for an embedded layout as exemplified in FIG. 3.

Figure 4:
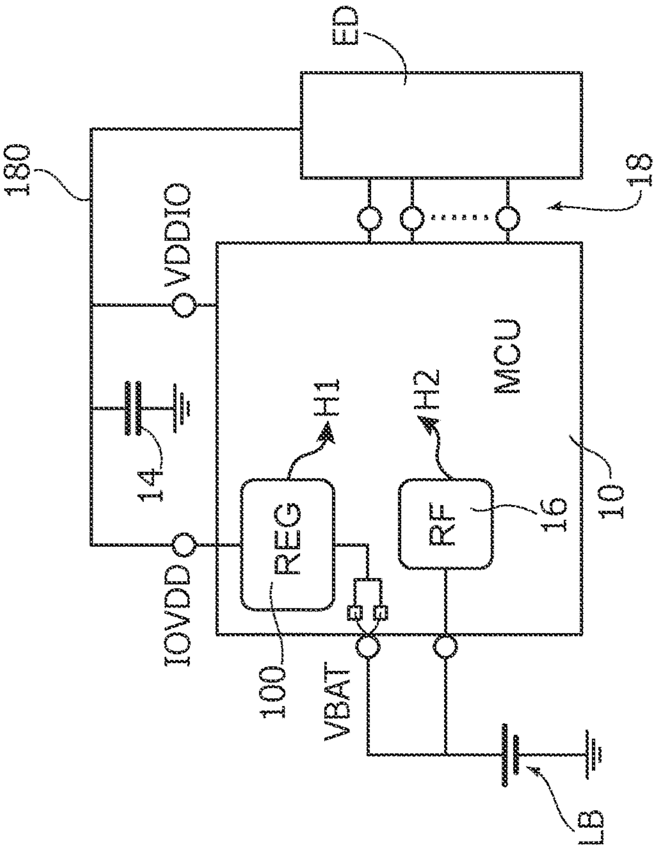
FIG. 4 is a block diagram illustrative of certain thermal dissipation issues that may arise in supply circuits including an embedded voltage regulator.

For that reason, unless the context indicates otherwise, the general disclosure provided in the foregoing in connection with FIGS. 1 to 3 also applies to the other figures and will not be repeated for brevity in connection with the figures from FIG. 4 onwards.

The regulator (REG) 100 may be a low drop-out (LDO) regulator.

As discussed in the following (in connection with FIG. 8, for instance), the regulator 100 may comprise high-drive (HD) LDO circuitry, designated 102, as well as low-power (LP) LDO circuitry, designated 104.

LDO is an acronym for "Low Drop-Out" and designates DC linear voltage regulator architecture configured to regulate its output voltage (even) when the voltage supplied thereto is very close to the output voltage.

Using an embedded voltage regulator such as an LDO regulator may lead, in operation, to an increase in (junction) temperature that, in certain extreme cases, may weigh against using such a regulator.

In that respect one may refer to the diagram of FIG. 4, where—unless the context indicates otherwise—parts of elements corresponding to parts or elements already discussed in connection with the previous figures are designated with corresponding reference symbols.

As exemplified in FIG. 4, the regulator 100 is configured to operate between: a first node VBAT configured to have applied thereto the voltage from the supply source (e.g., 4.5V from a battery), and a second node IOVDD configured to supply, via a line 180, an external device designated ED.

A decoupling capacitor 14 can be arranged intermediate the node IOVDD (line 180) and ground.

A further node, designated VDDIO, is coupled to the line 180, with the nodes IOVDD and VDDIO arranged "upstream" and "downstream" the capacitor 14.

The node VDDIO may be intended to provide voltage supply for circuitry such as 16 included in the circuit 10.

For instance, VDDIO may be the main supply node for the whole circuit 10 (e.g., a microcontroller) with the exception of the subsystem directly connected to VBAT.

The device ED being designated "external" emphasizes that this may represent a distinct element from the circuit 10. A memory such as a flash memory coupled to an MCU (such as 10) may be exemplary of such an external device ED.

For the sake of this description, one may assume that the circuit 10 is configured to co-operate with the external device ED via a set of I/O nodes (pins) 18.

The LDO regulator 100 thus receives at the node VBAT a voltage of 4.5V, for instance. This is the voltage that can be supplied from a battery coupled between the node VBAT and ground GND.

The (regulated) supply voltage applied to the external device ED (via the line 180) and to the node VDDIO will expectedly be lower, in the 1.8V-3.3V range.

In FIG. 4, reference 16 designates circuitry, of an analog type, for instance, such as RF (radio-frequency) circuitry.

It will be otherwise appreciated that the specific characteristics and mode of operation of the circuitry 16 and of the external device ED coupled with the circuit 10 are of no specific relevance for the embodiments.

The embodiments can thus be regarded as essentially "transparent" to the specific characteristics and mode operation of the circuitry 16 and/or the external device ED.

As discussed, using an embedded voltage regulator such as an LDO regulator 100 as illustrated in FIG. 4 may lead, in operation, to an increase in (junction) temperature that, in certain extreme cases, may weigh against using such a regulator.

For instance, if the battery voltage VBAT input to the regulator 100 reaches 4.5V and the regulated voltage at the node IOVDD at the output of the regulator (as supplied to the circuit ED) is set at 1.8V, the dissipated power H1 may be on the order of 540 mW: this is of course a pure example in so far as the actual dissipated power depends on the current, that is, on the load.

Assuming a conventional value for the package thermal resistance of about 35° C./W (as for current semiconductor device packages), this dissipated power may lead to a corresponding temperature increase on the order of 19° C.

Possible heat dissipation H2 from the circuit 16 (and other parts of the circuit 10) may add to the heat dissipation H1 from the regulator 100.

For instance, heat dissipation H2 from the circuit 16 may be from a few mW up to 800 mW for the highest consumption operating mode of a circuit such as the circuit 16.

The actual situation may depend on factors such as voltage drop across the regulator 100, characteristics of the load (device ED), heat generated by the circuitry 16, and so on.

As discussed, these factors make use of a voltage regulator such as an embedded LDO regulator hardly feasible in a context such as that exemplified in FIG. 4.

On the other hand, in certain applications, a 4.5V supply may not be considered, so that, in the very end, a voltage regulator such as regulator 100 may be ultimately redundant.

One or more embodiments contemplate the possibility of (virtually) "removing" (that is, de-activating) an embedded voltage regulator such as regulator 100.

Figure 5:
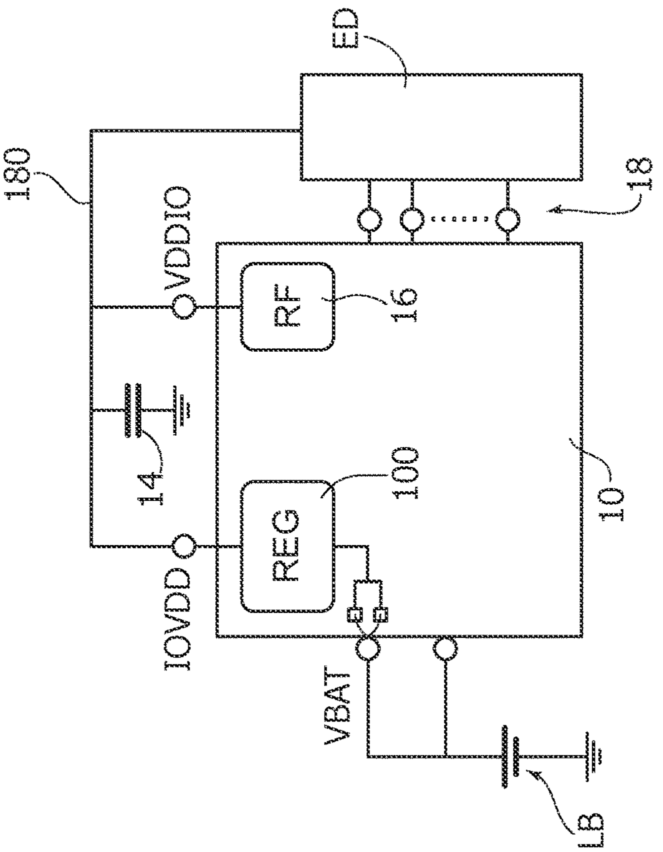
FIGS. 5, 6 and 7 are exemplary of different operating conditions supported by embodiments of the present description.
Figure 7:
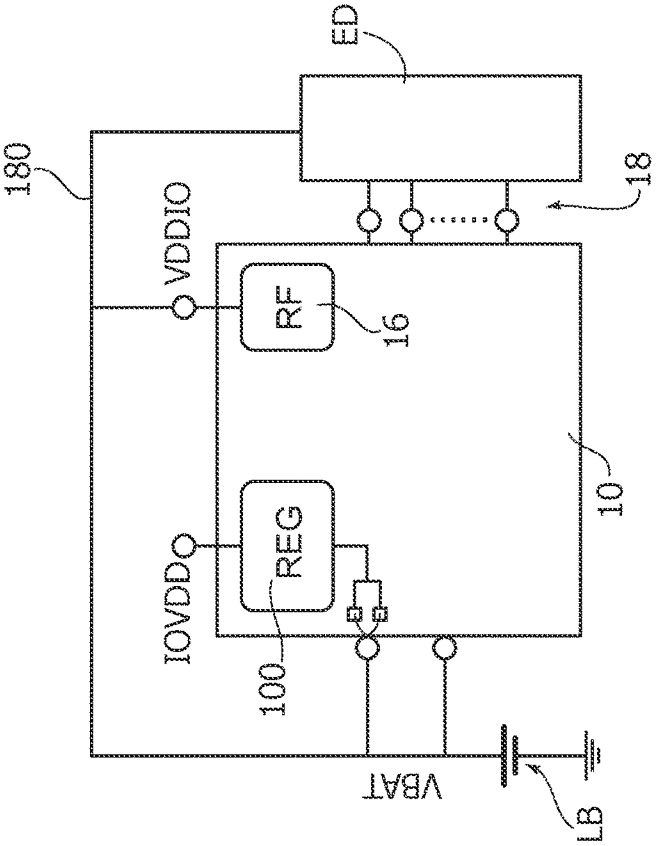
Figure 6:
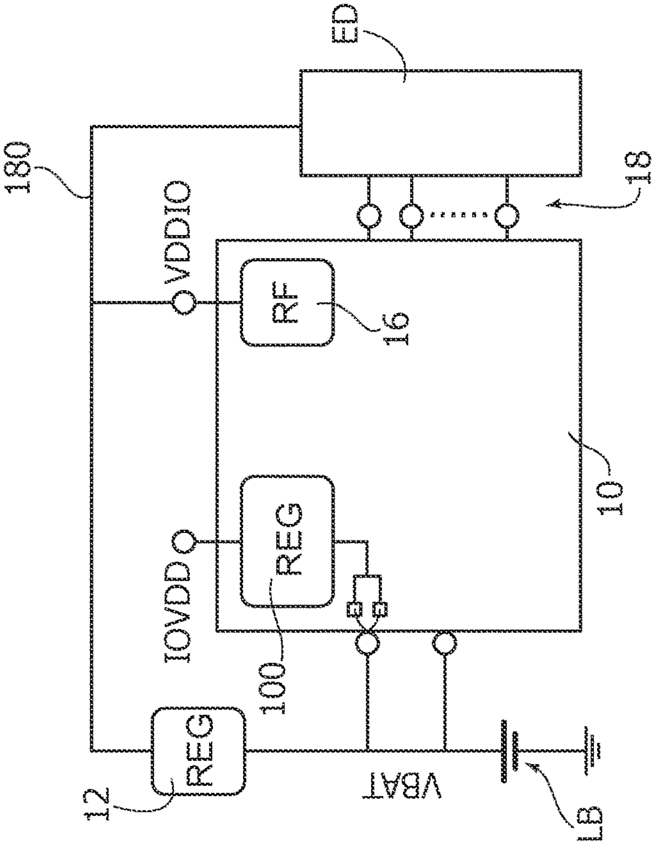

FIGS. 5 to 7 exemplify various desirable operation configurations for a circuit such as circuit 10.

FIG. 5 relates to a first "single supply" operating condition where a supply voltage VBAT (e.g., 4.5V from the battery LB) is applied to the voltage regulator 100.

In this first operating condition, the voltage regulator 100 is operating and provides, at the output node designated IOVDD, a regulated supply voltage for the external device (a memory, for instance) ED coupled via the line 180, with the supply voltage provided by the regulator 100 regulated in the range between 1.8V-3.3V, for instance. The same voltage can be applied to the node VDDIO.

FIGS. 6 and 7 refer to possible conditions where the voltage regulator 100 can be "removed" (that is, de-activated).

In the "dual-supply" operating conditions of FIGS. 6 and 7 the external load ED (and the node VDDIO) can be supplied: in the case illustrated in FIG. 6, at a voltage of, e.g., 1.8V-3.6V as provided by an external (e.g., PCB mounted) voltage regulator 12 (see also FIG. 2), or in the case illustrated in FIG. 7, at a voltage of, e.g., 2.5V-3.6V as derived from the battery LB.

FIG. 6 refers to the case where a battery such as a lithium-ion battery is used (e.g., up to 4.5V) and an embedded LDO such as the LDO 100 cannot be used for "thermal" reasons (junction temperature too high).

In this case an external LDO 12 is used to generate a voltage compatible with VDDIO (e.g., from 1.8V to 3.3V/3.6V) and with the external device (e.g., ED).

FIG. 7 is related to an (application-dependent) case where a lithium-ion battery is not used and the voltage VBAT is in the range 2.5V-3.3V/3.6V (these are just examples, with no hard constraints dictated by the specifications of the circuits involved).

In this case the same VBAT supply can used to power all the circuits involved, namely the (RF) circuitry 16 and all the circuits supplied via the node VDDIO (e.g., microcontroller) plus the external device (ED).

Of course, this case assumes that the supply of the external circuit ED is compatible with VBAT voltage range.

Summarizing, in FIG. 7 a voltage of 2.5-3.6V comes directly from the main supply source (e.g., battery).

It is once more recalled that the quantitative figures given above are purely exemplary and are not limiting of the embodiments.

The general idea is to offer to the user the possibility of tuning the configuration according to the specific application requirements, allowing then to get a desired cost/performance trade-off.

One or more embodiments address the problem of supporting different conditions of use, as exemplified in FIGS. 5, 6 and 7, facilitating at the same time low-power operation and performance as required.

Figure 8:
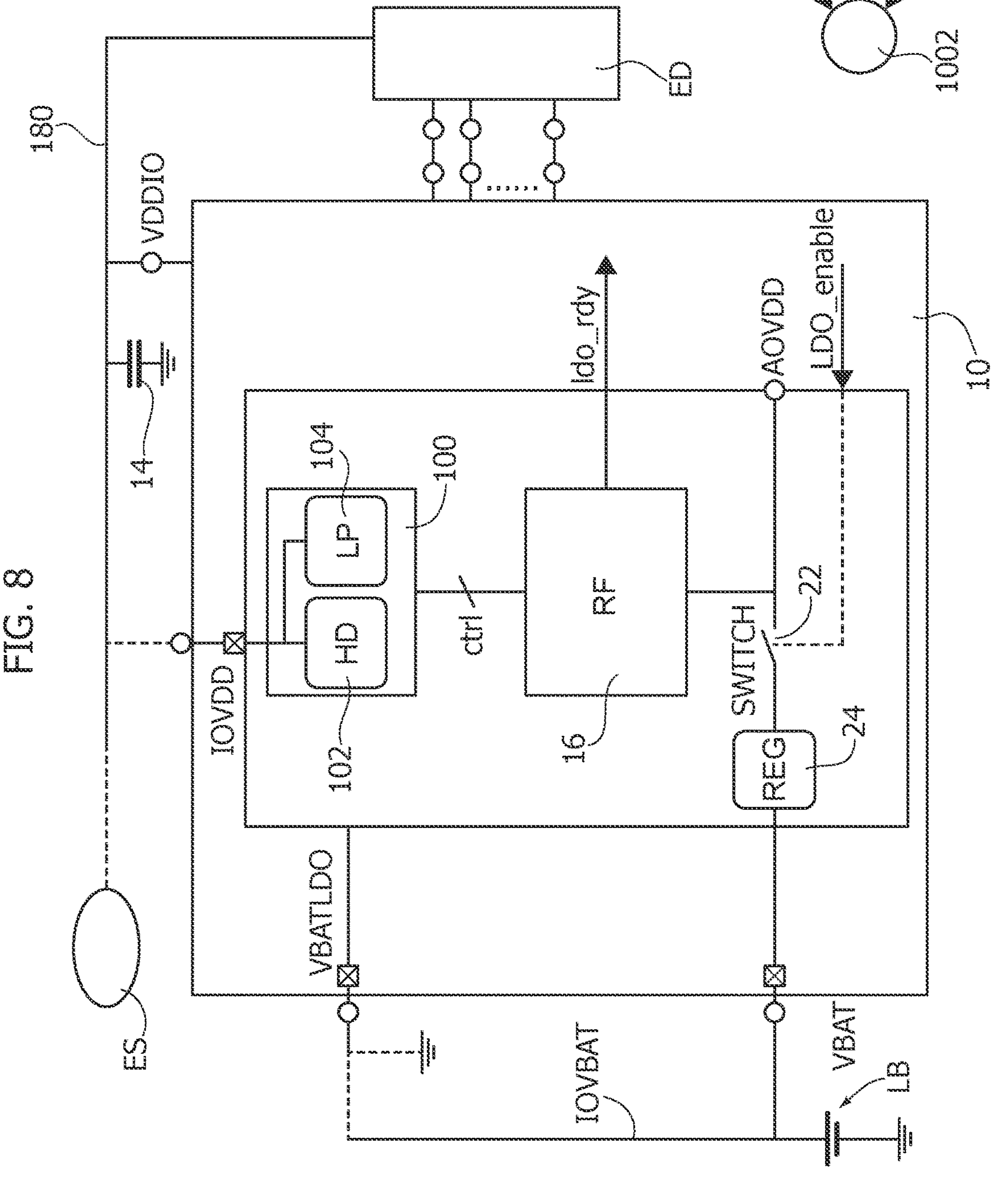
FIG. 8 is a block diagram exemplary of embodiments of the present description.

To that effect, the connectivity states of the circuit 10 corresponding to the, e.g., RF circuitry 16 being "off" (OFF state, that is, all the internal circuits in the circuit 10 de-activated) and "on" (RUN state, that is, all the internal circuits in the circuit 10 activated and running) are supplemented by two new states, namely:

- a first "OFF LDO" state, where, in order to support the operating conditions illustrated in FIG. 5, the regulator 100 is kept active ("on") with the possibility of supporting high-drive and low-power modes (see the high-drive circuitry 102 and the low-power circuitry 104 in FIG. 8) to obtain an optimized low-power mode for the whole circuit, for instance in conditions where the circuitry 16 is de-activated, and
- a second "RUN LDO" state, wherein the circuitry 16 is running with the regulator 100 active, so that the entire circuit 10 (including the regulator 100) is active.

In that way the possibility exists of activating the LDO 100 even if, e.g., the RF circuitry 16 is in an off state, so that the rest of the system can be supplied.

Circuit configurations as represented in FIGS. 5 to 7 can thus be represented by the following tables.

TABLE I

Single supply (e.g., VBAT @4.5 V and line 180/node VDDIO @1.8-3.3 V - FIG. 5)

| RF IP PowerMode | START-UP | RUN | RUN with RF | LOW POWER MODE |
|---|---|---|---|---|
| OFF | | | | |
| OFF LDO Low-power | | | | X |
| OFF LDO High-drive | X | X | | |
| RUN | | | | |
| RUN LDO | | | X | |

TABLE II

Dual supply (e.g., regulator 100 "removed", line 180/node VDDIO @1.8-3.6 V - FIG. 6 or @2.5-3.6 V - FIG. 7)

| RF IP Power Mode | START-UP | RUN | RUN with RF | LOW POWER MODE |
|---|---|---|---|---|
| OFF | X | X | | X |
| OFF LDO Low-power | | | | X |
| OFF LDO High-drive | | | | |
| RUN | | | X | |
| RUN LDO | | | | |

That is, in the single-supply mode of FIG. 5 and Table I above, the regulator 100 is activated in a START-UP state, e.g., in response to the battery LB being plugged in.

In that state/condition, the voltage at the node IOVDD gradually increased from zero in order to avoid damage to the circuit ED. Further details in that respect can be gathered from an Italian patent application filed on even date and partly assigned to the assignee of the instant application.

In the dual supply modes of FIGS. 6 and 7 and Table II above, the regulator 100 can be (kept) switched off or de-activated in response to a control signal ctrl from an (always on) control feature in the circuitry 16 that can also enable a low-power mode to reduce consumption.

In the dual-supply mode the LDO 100 can is permanently kept OFF. This can be achieved by grounding a pin VBATLDO (see FIG. 8).

In one or more embodiments, when the LDO regulator 100 is switched from the low-power mode (circuitry 104 active and circuitry 102 inactive) to the high-drive mode (circuitry 104 inactive and circuitry 102 active) corresponding information is made available in the voltage domain with a signal ldo_rdy from the control feature 16 asserted.

As exemplified in FIG. 8, one or more embodiments offer the possibility of selecting whether the embedded regulator 100 will be:

- started at power-on (START UP, as discussed above) and become available for possible shut-down, with the signal ldo_rdy asserted indicating that the embedded regulator 100 is ready for high-drive operation (high-drive circuitry 102 activated and low-power circuitry 104 de-activated), or
- "removed" from the circuit 10 (that is, kept inactive—both the high-drive circuitry 102 and the low-power circuitry 104), in which case the power supply for the circuit 10 and for the external device ED can be provided by an external supply source ES as discussed previously.

As exemplified in FIG. 8, a switch 22 (an electronic switch such as MOSFET transistor, for instance) is provided and controlled by a signal LDO_enable generated in a manner known per se of those skilled in the art in order to selectively switch-off the circuits (supplied via a low-voltage regulator 24) that control the embedded regulator 100. In that way, further power savings can be obtained when the circuit is operated in a low-power mode.

In FIG. 8, AOVDD denotes an internally-generated supply which facilitates control the LDO 100 and other circuits. If the LDO is not needed, the supply node/line AOVDD can be switched-off in a low-power mode to facilitate a further reduction in power consumption.

FIG. 8 is also illustrative of the possibility of coupling a node VBATLDO of the regulator 100 to the (general) supply voltage VBAT (a battery voltage at 4.5V, for instance: see the line designated IOVBAT in FIG. 8) or to ground GND so that the regulator 100 can be activated or "removed" from the circuit 10.

These options may be either software-controlled by the controller unit 10 itself, or take the form of wired logic.

Arrangements as discussed herein may involve a voltage regulator 100 including high-drive circuitry 102 capable of producing 200 mA at a voltage of 1.84V+/−6% and a current capability for the low-power circuitry 104 of about 2 mA with the regulated output voltage at the output node IOVDD programmable (via software, for instance) in 300 mv steps in the range of 1.8V-3.3V, for instance.

Figure 9:
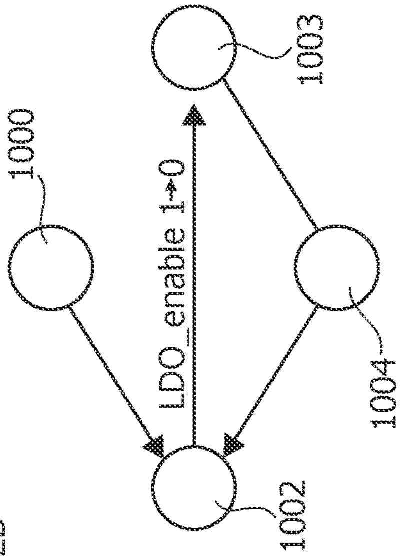
FIG. 9 is a graph exemplary of possible modes of operations of embodiments.

The following operating conditions may thus occur as exemplified in the blocks 1000, 1002, 1003 and 1004 in the graph of FIG. 9.

Block 1000 (behavior at power-on, for instance a battery LB providing a voltage VBAT is plugged in the circuit):

- VBATLDO=VBAT⇒the regulator 100 starts in high-drive mode (circuitry 102 activated and circuitry 104 de-activated, respectively).
- VBATLDO=GND⇒the voltage regulator 100 is kept off (both circuitry 102 and 104 de-activated).

Block 1002 (behavior when the circuitry 16 is in a "run" state):

- VBATLDO=VBAT⇒the regulator 100 is kept or switched in high-drive mode (circuitry 102 activated and circuitry 104 de-activated).
- VBATLDO=GND⇒the regulator 100 is kept off (both circuitry 102 and circuitry 104 de-activated).

Block 1003 (behavior when the circuitry 16 is in an off (de-activated) state:

- VBATLDO=VBAT with the signal LDO_enable asserted (transition 1⇒0, for instance); the switch 22 is closed and the voltage regulator 100 is switched in low-power mode (circuitry 102 de-activated and circuitry 104 activated).
- VBATLDO=GND with the LDO_enable signal de-asserted (transition 1⇒0, for instance); the switch 22 is opened with the regulator 100 de-activated both at 102 and 104.

Block 1004 (behavior upon exit from the off-state):

- VBATLDO=VBAT⇒the regulator 100 switches back to operation in a high drive mode (circuitry 102 activated and circuitry 104 de-activated) with the circuit 16 asserting a corresponding signal ldo_rdy for instance with a transition 0⇒1.
- VBATLDO=GND⇒the regulator 100 is kept in an off-state (circuitry 102 and circuitry 104 both de-activated).

Solutions as discussed previously provide flexibility in configuring a device supply scheme as a function of specific application requirements and conditions of use.

For instance, one or more solutions as discussed herein may take an "aggressive" approach in facilitating low-power operation by noting that a "high-voltage" supply at 4.5V may not be desired, thus configuring the circuit for single-supply operation at, e.g., 3.6V.

In case a "high-voltage" supply at 4.5V is desirable, either of two options such as single-supply at e.g., 4.5V (no thermal issues expected to arise) or dual-supply at 4.5/3.6V (thermal issues expected to arise) can be selectively adopted by taking into account possible thermal issues.

One or more embodiments facilitate control of an embedded voltage regulator such as an LDO voltage regulator, facilitating power setting when the regulator is disabled by resorting to an isolation approach when high-voltage operation is not desired.

One or more embodiments facilitate selecting an adequate supply scheme according to specific application requirements in terms of power consumption, battery supply range and thermal performance.

Solutions as discussed herein facilitate achieving that goal with a reduced power consumption and reduced semiconductor area occupancy.

Without prejudice to the underlying principles, the details and embodiments may vary, even significantly, with respect to what has been described by way of example only without departing from the extent of protection.

The extent of protection is determined by the annexed claims.

The invention claimed is:

1. A circuit, comprising:

- a first node;
- a second node configured to provide electrical supply power to an electrically powered device;
- a voltage regulator coupled to the first node and configured to provide a regulated voltage to the second node, said voltage regulator including first regulator circuitry configured to provide full-power operation of the voltage regulator and second regulator circuitry configured to provide low-power operation of the voltage regulator;

wherein the circuit is configured to operate:

- i) in a first mode of operation wherein: when a voltage at said first node is at a first voltage level, said first regulator circuitry in the voltage regulator is activated with said second regulator circuitry inactive and when the voltage at said first node is at a second voltage level the voltage regulator is kept de-activated;

ii) in a second mode of operation wherein: when the voltage at said first node is at said first voltage level, said first regulator circuitry in the voltage regulator is active with said second regulator circuitry inactive and when the voltage at said first node is at said voltage the voltage regulator is inactive with both the first voltage regulator circuitry and the second regulator circuitry inactive; and iii) in a third mode of operation, the second regulator circuitry in the voltage regulator is active and said first regulator circuitry is inactive irrespective of the voltage at said first node being at said first voltage level or at said second voltage level; and a supply node configured to be coupled to said electrically powered device, wherein said supply node is configured to be coupled, in response to the voltage regulator being inactive, to a power supply source selected from the group consisting of: a further voltage regulator external to the circuit, wherein the further voltage regulator is coupled to a voltage source at said first voltage level, and a voltage source at said first voltage level.

2. The circuit of claim 1, wherein the circuit is configured to switch from said third mode of operation to said second mode of operation in response to the voltage at said first node changing to said first voltage level from said second voltage level.

3. The circuit of claim 1, further comprising control circuitry for the voltage regulator that is configured to be switched off in response to the voltage regulator being inactive.

4. The circuit of claim 1, wherein the circuit is configured to issue a readiness signal indicating availability to switch from said second mode of operation to said third mode of operation in response receipt of a signal indicative of a request for low-power operation.

5. The circuit of claim 1, wherein said first regulator circuitry in the voltage regulator is activated to said first mode of operation in response to a supply source being coupled to said first node applying said first voltage level to said first node.

6. The circuit of claim 1, wherein:

the voltage regulator comprises a Low Drop Out (LDO) regulator; and the circuit comprises a microcontroller unit.

7. The circuit of claim 1, wherein the first voltage level is a battery voltage and the second voltage level is a ground voltage.

8. A system, comprising:

a circuit according to claim 1, and an electrically powered device coupled to said second node.

9. The system of claim 8, wherein the electrically powered device coupled to said second node comprises a memory.

10. A method of operating a circuit according to claim 1, comprising:

coupling an electrically powered device to said second node; and coupling a supply source to said first node.

11. A circuit, comprising:

a first voltage input node configured to receive a supply voltage from a first power supply source;

a second voltage input node coupled in a first circuit configuration to the supply voltage and in a second circuit configuration to a ground voltage;

a low voltage regulator circuit coupled to receive the supply voltage from the second voltage input node and output a first regulated voltage;

an operational circuit configured to generate control signals;

a switch configured to selectively apply the first regulated voltage to the operational circuit in response to an enable signal;

a voltage regulator coupled to the second voltage input node and including first regulator circuitry and second regulator circuitry;

wherein in the first circuit configuration the first regulator circuitry is controlled in response to the control signals from the operational circuit to provide full-power operation of the voltage regulator in generating a second regulated output voltage at an output voltage node and the second regulator circuitry is controlled in response to the control signals from the operational circuit to provide low-power operation of the voltage regulator in generating the second regulated output voltage at the output voltage node;

wherein in the second circuit configuration the first regulator circuitry and second regulator circuitry are not operational;

wherein at power-on and in the first circuit configuration the control signals activate the first regulator circuitry and deactivate second regulator circuitry; and wherein in the first circuit configuration when the operational circuit is not active the control signals deactivate the first regulator circuitry and activate second regulator circuitry.

12. The circuit of claim 11, wherein, when in the second circuit configuration where the first regulator circuitry and second regulator circuitry are not operational, the output voltage node is configured to be coupled a second power supply source.

13. The circuit of claim 12, wherein the second power supply source comprises an external voltage regulator circuit powered from the first power supply source.

14. The circuit of claim 12, wherein the second power supply source comprises the first power supply source.

15. The circuit of claim 11, wherein the first power supply source is a battery.

16. The circuit of claim 11, wherein in the first circuit configuration when the operational circuit is active the control signals activate the first regulator circuitry and deactivate second regulator circuitry.

17. The circuit of claim 11, wherein in the first circuit configuration when the operational circuit transitions from not active to active the control signals activate the first regulator circuitry and deactivate second regulator circuitry.

18. A system, comprising:

a circuit according to claim 11, and an electrically powered device coupled to said output voltage node.

19. The system of claim 18, wherein the electrically powered device coupled to said output voltage node comprises a memory.

* * * * *